(12) United States Patent
Onishi (10) Patent No.: US 7,646,908 B2
(45) Date of Patent: Jan. 12, 2010

(54) DEFECT DETECTION APPARATUS AND DEFECT DETECTION METHOD

(75) Inventor: Hiroyuki Onishi, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 834 days.

(21) Appl. No.: 11/203,147

(22) Filed: Aug. 15, 2005

(65) Prior Publication Data

US 2006/0067571 A1  Mar. 30, 2006

(30) Foreign Application Priority Data

Sep. 29, 2004  (JP)  ............................ P2004-283122

(51) Int. Cl.
G06K 9/00  (2006.01)

(52) U.S. Cl. ................. 382/154; 382/149; 700/110

(58) Field of Classification Search .......... 257/E21.527, 257/E21.53; 356/954; 369/53.17; 382/145, 382/149; 438/450; 700/110; 702/35, 36, 702/125
See application file for complete search history.

(56) References Cited

U.S. PATENT DOCUMENTS

| | | | | |
|---|---|---|---|---|
| 4,972,325 | A | * | 11/1990 | Hara ........................ 702/20 |
| 5,325,443 | A | * | 6/1994 | Beatty et al. ............... 382/147 |
| 5,714,691 | A | * | 2/1998 | Hill ........................ 73/861.04 |
| 6,154,561 | A | * | 11/2000 | Pratt et al. ................. 382/141 |
| 6,539,106 | B1 | | 3/2003 | Gallarda et al. |
| 6,950,547 | B2 | * | 9/2005 | Floeder et al. .............. 382/143 |
| 7,295,695 | B1 | * | 11/2007 | Dayal ....................... 382/145 |
| 2002/0042682 | A1 | | 4/2002 | Yoshitake et al. |
| 2002/0113234 | A1 | | 8/2002 | Okuda et al. |
| 2002/0159643 | A1 | * | 10/2002 | DeYong et al. ............. 382/228 |

(Continued)

FOREIGN PATENT DOCUMENTS

JP  04-350776  12/1992

(Continued)

OTHER PUBLICATIONS

Korean Office Action issued in corresponding Korean Patent Application No. KR 10-2005-0087504, dated Sep. 15, 2006.

(Continued)

*Primary Examiner*—Matthew C Bella
*Assistant Examiner*—Gregory F Cunningham
(74) *Attorney, Agent, or Firm*—McDermott Will & Emery LLP (57) ABSTRACT

A defect detection apparatus (1) comprises an image pickup part (3) for picking up an image of a substrate (9) to acquire a grayscale target image, from which pixel values of the target image are sequentially outputted to a defect detector (43). The defect detector (43) compares the target image with a reference image to generate a defect region image representing regions of defects included in a plurality of predetermined inspection regions, to be stored in a defect region image memory (44). A computer (5) obtains an area and a barycentric position of each of the defects in the defect region image to specify an inspection region including the defect and performs limitation (i.e., selection) of defects on the basis of a defect detection condition set for each inspection region on the area of defect. It is possible to detect defects with high efficiency by using a defect detection condition on a different area of defect for each inspection region.

12 Claims, 8 Drawing Sheets

U.S. PATENT DOCUMENTS

2004/0018436 A1* 1/2004 Ishikawa .................... 430/5
2004/0095148 A1* 5/2004 Hilliard et al. .............. 324/654
2008/0114255 A1* 5/2008 Schwartz et al. ............ 600/474

FOREIGN PATENT DOCUMENTS

| | | |
|---|---|---|
| JP | 11-135583 A | 5/1999 |
| JP | 11-214462 | 8/1999 |
| JP | 2002-323458 A | 11/2002 |
| JP | 2003-337013 A | 11/2003 |
| JP | 2004-12779 A | 1/2004 |
| JP | 2004-045125 | 2/2004 |

OTHER PUBLICATIONS

Japan Office Action issued in Japanese Patent Application No. JP 2004-283122, dated Oct. 21, 2009.

* cited by examiner

| W-2,-2 | W-1,-2 | W0,-2 | W1,-2 | W2,-2 |
|---|---|---|---|---|
| W-2,-1 | W-1,-1 | W0,-1 | W1,-1 | W2,-1 |
| W-2,0 | W-1,0 | W0,0 | W1,0 | W2,0 |
| W-2,1 | W-1,1 | W0,1 | W1,1 | W2,1 |
| W-2,2 | W-1,2 | W0,2 | W1,2 | W2,2 |

FIG. 14

DEFECT DETECTION APPARATUS AND DEFECT DETECTION METHOD

BACKGROUND OF THE INVENTION

1. Field of the Invention

The present invention relates to a technique for detecting defects of a pattern formed on a substrate.

2. Description of the Background Art

In a field of inspecting a pattern formed on a semiconductor substrate, a glass substrate, a printed circuit board, or the like (hereinafter, referred to as "substrate"), conventionally, a comparison check method has been used. For example, from a grayscale target image to be inspected and a grayscale reference image, a differential absolute value image representing absolute values of differences in pixel value between these images is obtained and each of pixels in this image is binarized by a predetermined threshold value, to detect a region specified on a pixel basis as a defect.

Japanese Patent Application Laid Open Gazette No. 11-135583 (Document 1) discloses a method for detecting a defect with high accuracy with detection sensitivity in accordance with each inspection region, from a grayscale differential image generated with a grayscale conversion parameter and a threshold pixel value for each inspection region.

On a substrate, usually, a variety of patterns are formed. In a case where a very fine and dense wiring pattern is formed, for example, even a defect whose size (area) corresponds to one pixel or so may be critical, causing a short circuit, an open or the like in interconnection. Alternatively, in a case where a coarse and sparse pattern is formed, a defect of one pixel or so mostly has little effect. In a case where such a dense pattern and a sparse pattern are mixed in a target image, even if the detection sensitivity is changed as appropriate, as shown in Document 1, some small and unnecessary defects are detected to some degree and the efficiency of defect detection is not largely improved, and this requires a long time for an operator or other apparatus to check (review) the picked-up image of the defects.

SUMMARY OF THE INVENTION

The present invention is intended for a defect detection apparatus for detecting defects of a pattern formed on a substrate and it is an object of the present invention to detect defects in accordance with each inspection region with high efficiency.

According to an aspect of the present invention, the defect detection apparatus for detecting defects of a pattern formed on a substrate comprises an image pickup part for picking up an image of a substrate to acquire a grayscale target image, a defect detector for detecting defects included in a plurality of predetermined inspection regions in the target image, and a defect limiting part for performing limitation of defects to be detected by the defect detector, on the basis of a defect detection condition which is determined for each inspection region on an area or a shape of defect, and in the defect detection apparatus of this aspect of the present invention, the defect detector generates a grayscale defect image representing a defect, from the target image, and the defect limiting part comprises a filter circuit for applying a filter to the defect image, with positioning the center of said filter almost at each pixel in the defect image, and the filter is set in accordance with a defect detection condition for an inspection region including the (each) pixel, and a binarization circuit for binarizing the defect image to which the filter is applied, to generate a defect region image representing regions of defects after limitation.

By the defect detection apparatus of this aspect of the present invention, it is possible to detect defects in accordance with each inspection region, with a simple construction using a filter.

According to another aspect of the present invention, the defect detection apparatus comprises an image pickup part for picking up an image of a substrate to acquire a grayscale target image, a filter circuit for applying a filter to the target image, and a defect detector for detecting defects on the basis of the target image to which the filter is applied, and in another aspect of the present invention, a plurality of inspection regions in which defects are detected by the defect detector and a defect detection condition on an area or a shape of defect in each of the plurality of inspection regions are determined with respect to the target image in advance, and the filter circuit applies a filter to the target image with positioning the center of the filter almost at each pixel in the target image, and the filter is set in accordance with a defect detection condition for an inspection region including the (each) pixel.

Also by the defect detection apparatus of another aspect of the present invention, it is possible to detect defects in accordance with each inspection region, with a simple construction using a filter.

According to still another aspect of the present invention, the defect detection apparatus comprises an image pickup part for picking up an image of a substrate to acquire a grayscale target image, a defect detector for detecting defects included in a plurality of predetermined inspection regions in a target image, and a defect limiting part for performing limitation of defects to be detected by the defect detector, on the basis of a defect detection condition which is determined for each inspection region on an area or a shape of defect, and in the defect detection apparatus of still another aspect of the present invention, the defect detector generates a binary defect region image representing regions of defects in the target image, the defect limiting part is an arithmetic circuit for scanning a pixel array in the defect region image to check if the pixel array is included in the regions of defects and the pixel array is changeable in accordance with a defect detection condition, and the arithmetic circuit comprises an extraction circuit for extracting a group of pixel values in a predetermined extraction range which is moved in the defect region image, a plurality of AND circuits each for outputting a logical product of values of pixels out of the group of pixel values, which are included in a pixel array satisfying a defect detection condition, and a selection circuit for selecting any of a plurality of logical products outputted from the plurality of AND circuits in accordance with a defect detection condition for an inspection region including a predetermined pixel in the extraction range.

By the defect detection apparatus of still another aspect of the present invention, it is possible to detect defects in accordance with an inspection region at high speed, with a simple construction.

The present invention is also intended for a defect detection method for detecting defects of a pattern formed on a substrate.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
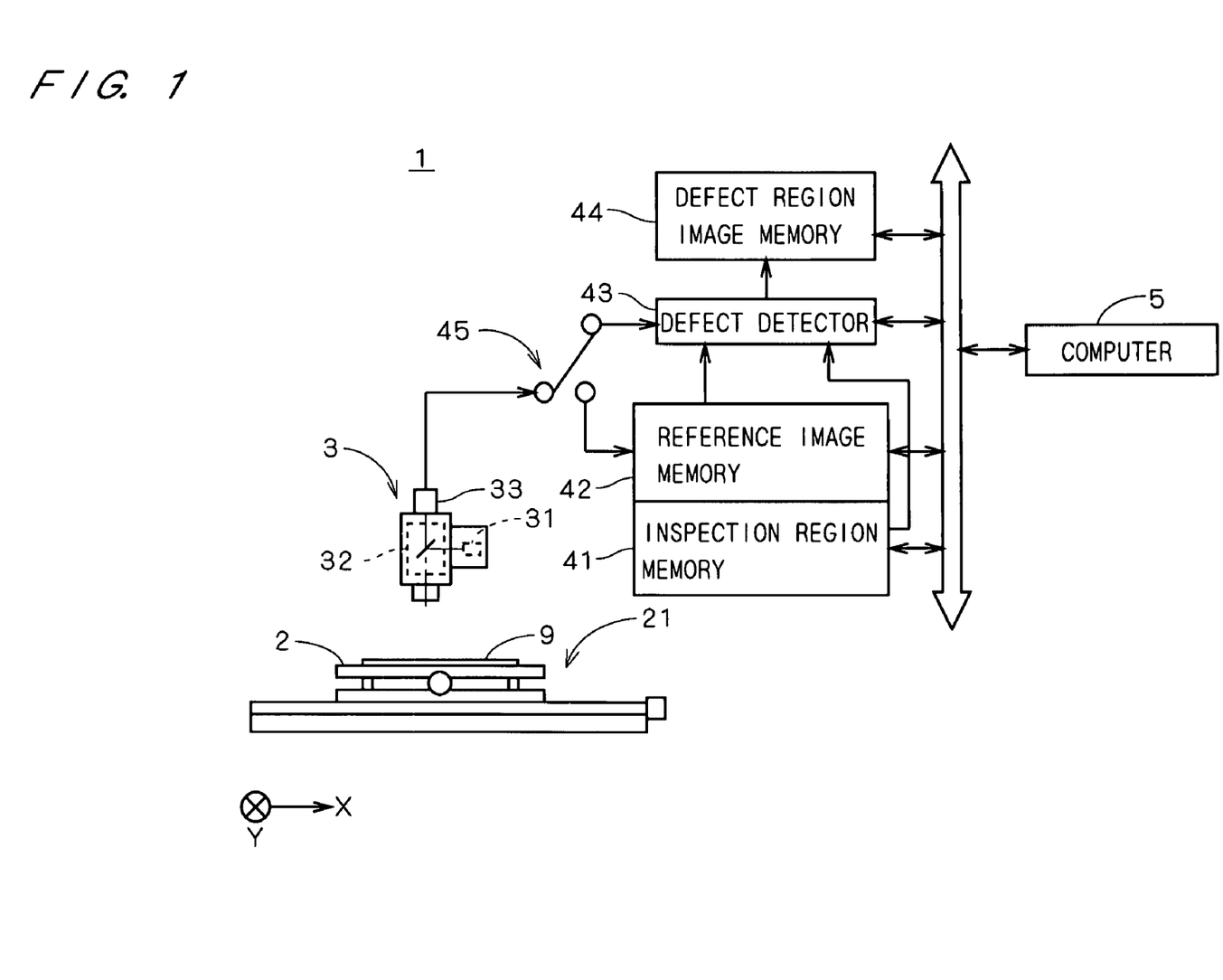
FIG. 1 is a view showing a construction of a defect detection apparatus in accordance with a first preferred embodiment.

FIG. 1 is a view showing a construction of a defect detection apparatus 1 in accordance with the first preferred embodiment of the present invention. The defect detection apparatus 1 comprises a stage 2 for holding a semiconductor substrate 9 on which a predetermined wiring pattern is formed, an image pickup part 3 for picking up an image of the substrate 9 to acquire a grayscale image of the substrate 9 and a stage driving part 21 for moving the stage 2 relatively to the image pickup part 3.

The image pickup part 3 has a lighting part 31 for emitting an illumination light, an optical system 32 which guides the illumination light to the substrate 9 and receives the light from the substrate 9 and an image pickup device 33 for converting an image of the substrate 9 formed by the optical system 32 into an electrical signal, and the image pickup device 33 outputs image data of the substrate 9. The stage driving part 21 has mechanisms for moving the stage 2 in the X direction and the Y direction of FIG. 1. Though the image is acquired by the image pickup part 3 with the illumination light which is a visible light in the first preferred embodiment, for example, an electron beam, an X-ray or the like may be used to acquire images.

The defect detection apparatus 1 further comprises an inspection region memory 41 for storing an image representing a plurality of inspection regions defined in an image to be inspected (i.e., a target image), a reference image memory 42 for storing a reference image, a defect detector 43 for detecting defects included in a plurality of inspection regions of the target image, a defect region image memory 44 for storing an image (hereinafter, referred to as "defect region image") representing regions of defects included in a plurality of inspection regions of the target image and a computer 5 constituted of a CPU for performing various computations, a memory for storing various pieces of information and the like. The computer 5 controls these constituent elements in the defect detection apparatus 1.

Figure 2:
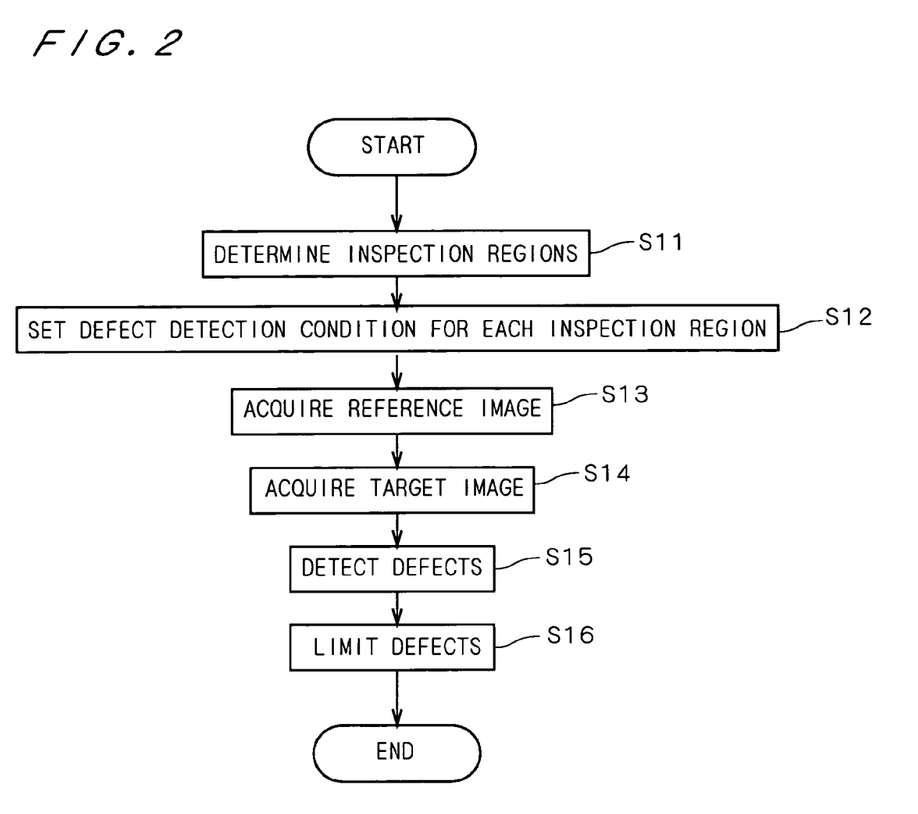
FIG. 2 is a flowchart showing an operation flow for detecting defects of a pattern.

FIG. 2 is a flowchart showing an operation flow of the defect detection apparatus 1 for detecting defects of a pattern formed on the substrate 9. First, an operator gives an input specifying a plurality of regions on the substrate 9 to the defect detection apparatus 1 through an input part of the computer 5, to define a plurality of inspection regions in the defect detection apparatus 1 (Step S11). The computer 5 is provided with a display part on which the operator can easily define the inspection regions by GUI (Graphical User Interface).

Figure 3:
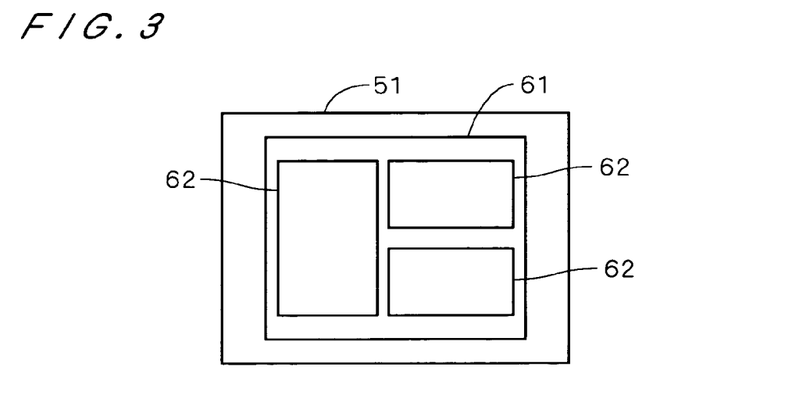
FIG. 3 is a view showing an image displayed on a display part of a computer.

FIG. 3 is a view showing an image displayed on the display part of the computer 5. As shown in FIG. 3, in a window 51 on the display part, a basic region 61 of predetermined size on the substrate 9 is displayed (a pattern included in this region may be displayed) and a plurality of inspection regions 62 which are defined are displayed, being superimposed on the basic region 61, in a specifiable manner. In the computer 5, a range of each inspection region 62 is stored by storing the positions (coordinates) of upper-left and lower-right vertices of a rectangle defining the inspection region 62 on the basic region 61 of FIG. 3. The operator sets a threshold value on the area (which is a threshold size of defect to be detected and defined by the number of pixels) of a defect for each inspection region 62 as a defect detection condition to be stored in the computer 5 (Step S12).

Figure 4:
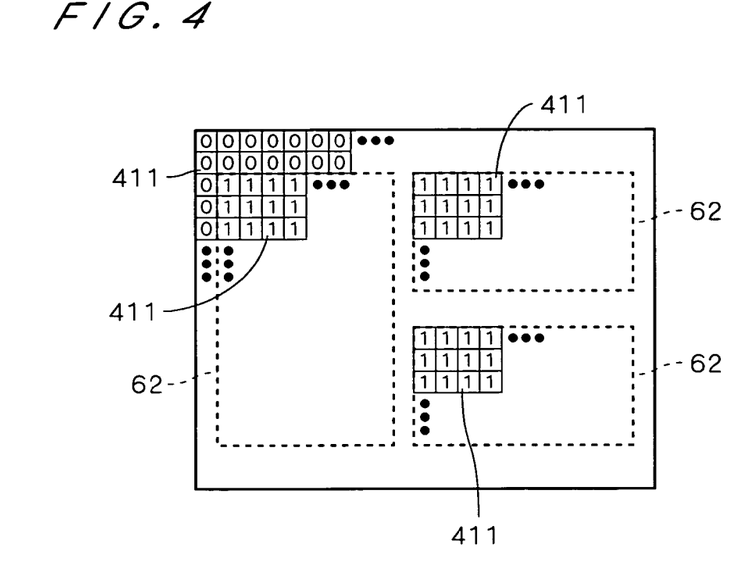
FIG. 4 is a conceptual diagram showing an inspection region memory.

The inspection region memory 41 has a plurality of cells arranged in the same manner as the pixels which are arranged in an image acquired by the image pickup part 3 (though the cells do not necessarily have to be actually arranged but only have to be specifiable like the arrangement of the pixels), in which data of binary bitmap can be stored. In the inspection region memory 41, as shown in the conceptual view of FIG. 4, a value of "1" is inputted to the cells 411 which correspond to the pixels included in each of the defined inspection regions 62 (indicated by broken lines in FIG. 4) and a value of "0" is inputted to the other cells 411.

Subsequently, a substrate for reference (hereinafter, referred to as "reference substrate") 9 on which the same pattern is formed as that formed on the substrate 9 to be inspected (target substrate) is put on the stage 2 of FIG. 1 and an image pickup position of the image pickup part 3 is adjusted to a region on the reference substrate 9 in which the same pattern is formed as that formed in the basic region 61 to acquire the reference image (Step S13). At this time, the image pickup part 3 gets connected to the reference image memory 42 through a switch 45 and the reference image is thereby stored into the reference image memory 42.

After the reference image is acquired, the reference substrate 9 is removed from the stage 2 and the target substrate 9 is put on the stage 2. The switch 45 gets connected to the defect detector 43 and an image of the basic region 61 on the substrate 9 is picked up to be acquired as a target image (Step S14). Pixel values of the target image are sequentially outputted to the defect detector 43 and those of the reference image in the reference image memory 42 are also outputted to the defect detector 43. Alternatively, the target image and the reference image may be acquired by picking up respective images of two regions on the target substrate 9 which are away from each other by a predetermined period (e.g., a distance between centers of patterns of dies arranged on the substrate 9). The reference image may be created from design data (CAD data) and prepared to be inputted to the reference image memory 42.

The defect detector 43 specifies a pixel value of the reference image which corresponds to each of the pixel values in the target image to obtain a differential absolute value of these pixel values. The differential absolute value is compared with a predetermined threshold value and binarized by setting "1" when the differential absolute value is equal to or larger than the threshold value and setting "0" when the differential absolute value is smaller than the threshold value. At the same time, a value of the cell 411 in the inspection region memory 41, which corresponds to each of the pixel values in the target image, is read out (see FIG. 4) and a logical product of this value and the binarized value is calculated. With this operation, (regions of) defects included in a plurality of inspection regions 62 in the target image are detected (Step S15).

Figure 5:
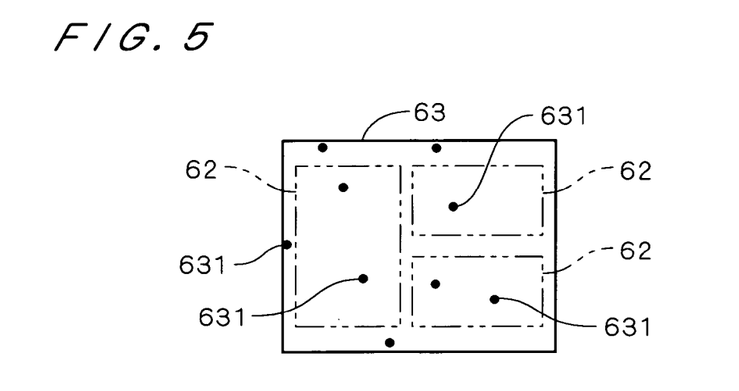
FIG. 5 is a view showing a binary image representing regions of defects in a target image.
Figure 6:
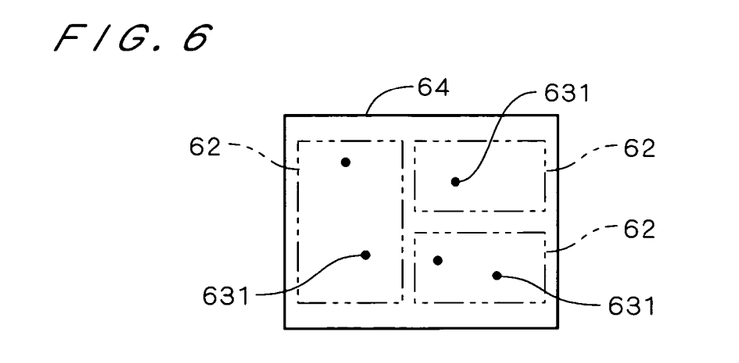
FIG. 6 is a view showing a defect region image.

Through the above operation performed by the defect detector 43, the target image and the reference image are positionally adjusted to each other and the target image and the reference image after being positionally adjusted are compared with each other to acquire a differential absolute value image, and the differential absolute value image is binarized with a predetermined threshold value to generate a binary image 63 representing regions 631 of defects in the target image as shown in FIG. 5 (though the regions 631 are actually very small regions and indicated by points in FIG. 5), and further a region other than the inspection regions 62 (indicated by two-dot chain lines in FIG. 5) in the binary image 63 is masked, to generate a binary defect region image 64 representing the regions 631 of defects included in a plurality of inspection regions 62 as shown in FIG. 6. Pixel values of the defect region image 64 are inputted to the defect region image memory 44 and stored therein. The threshold value for binarizing the differential absolute values is included in the defect detection condition and the threshold value is different for each inspection region 62.

The computer 5 reads out pixel values for each region of predetermined size from the defect region image memory 44 and operates a labeling operation on the pixel values to calculate barycentric coordinates and an area (i.e., the number of pixels) of each defect. Subsequently, the barycentric coordinates of each defect is compared with the range of each inspection region 62 to specify an inspection region 62 including the defect, and an area of each defect is compared with an area threshold value indicated by the defect detection condition set for the inspection region 62 including the defect. Then, the area of the defect is equal to or larger than the area threshold value, it is determined that the defect should be a defect to be detected and information on the defect, such as barycentric coordinates, an area and the like, is stored in the computer 5. With this operation, the defects to be detected are limited (i.e., selected) to some out of all the defects included in the defect region image stored in the defect region image memory 44, whose areas each are not smaller than the area threshold value of the defect detection condition (Step S16).

An image (a defect map) representing positions of defects after the limitation (i.e., selected defects) is displayed on the display part as necessary and on the basis of this defect map, the defects are efficiently reviewed by an operator or other dedicated apparatus. Then, a cause of defects is specified and quickly fed back to process steps in a semiconductor manufacturing process.

Thus, in the defect detection apparatus 1, the defect detector 43 detects defects included in a plurality of inspection regions 62 in the target image and some functions which are implemented with software by the computer 5 perform limitation of the defects which are detected by the defect detector 43 on the basis of the defect detection condition set for each inspection region 62 on the area of defect.

Figure 7A:
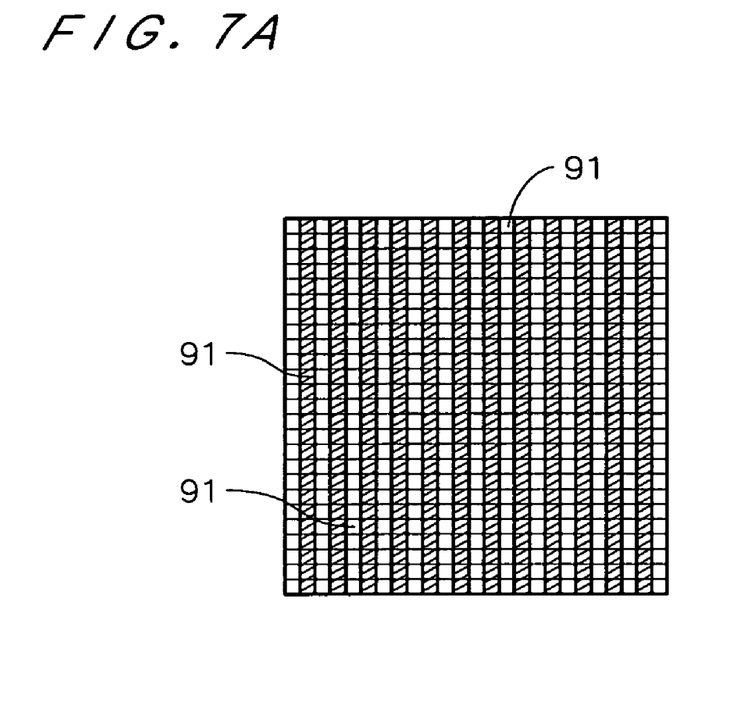
FIG. 7A is a view showing a region where a fine wiring pattern is formed.
Figure 7B:
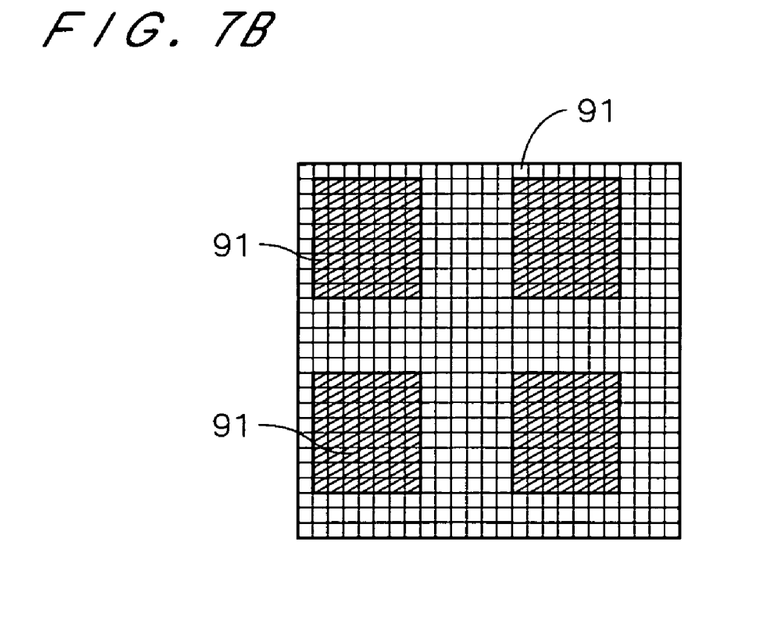
FIG. 7B is a view showing a region where a coarse wiring pattern is formed.

In a target image, even a defect having a size of one pixel 91 or so can cause a short circuit, an open or the like in interconnection in such a region as shown in FIG. 7A where a very fine and dense wiring pattern (hatched in FIG. 7A) is formed and the defect having a size of one pixel 91 or so does not produce a significant effect in such a region as shown in FIG. 7B where a relatively coarse and sparse pattern (hatched in FIG. 7B) is formed. In such a case, if the defect detection is performed with the detection sensitivity (the threshold value used for binarizing the differential absolute value image) simply changed for each inspection region 62, even a defect which does not need to be detected is disadvantageously detected. In the defect detection apparatus 1 of FIG. 1, however, by using the defect detection condition on a different area of defect for each inspection region 62, it is possible to correctly limit the defects to be detected and perform the defect detection with high efficiency.

Figure 8:
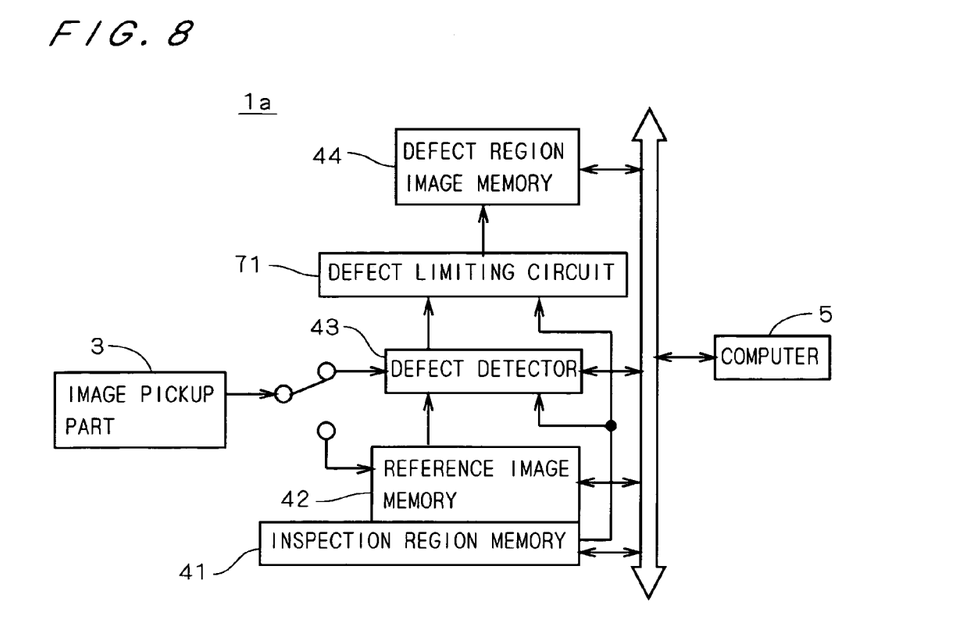
FIG. 8 is a view showing a construction of a defect detection apparatus in accordance with a second preferred embodiment.

FIG. 8 is a view showing a construction of a defect detection apparatus 1a in accordance with the second preferred embodiment of the present invention. The defect detection apparatus 1a of FIG. 8 is different from the defect detection apparatus 1 of FIG. 1 in that a defect limiting circuit 71 is provided between the defect detector 43 and the defect region image memory 44 and the inspection region memory 41 stores data of multivalued bitmap. The constituent elements other than the above are identical to those in the defect detection apparatus 1 of FIG. 1 and represented by the same reference signs.

Figure 9:
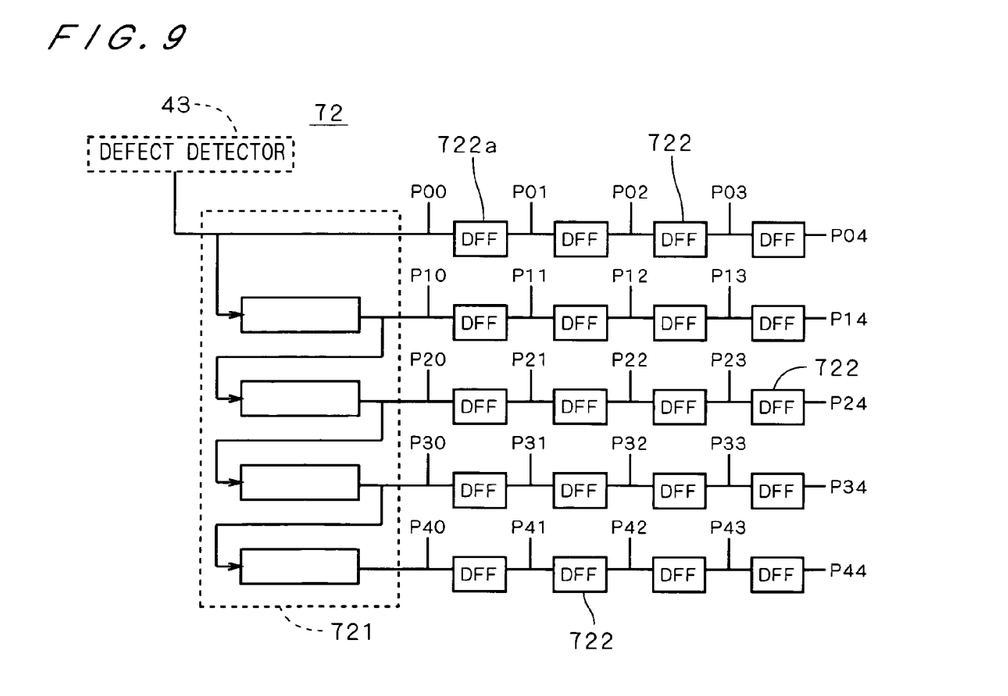
FIG. 9 is a view showing an extraction circuit.
Figure 10:
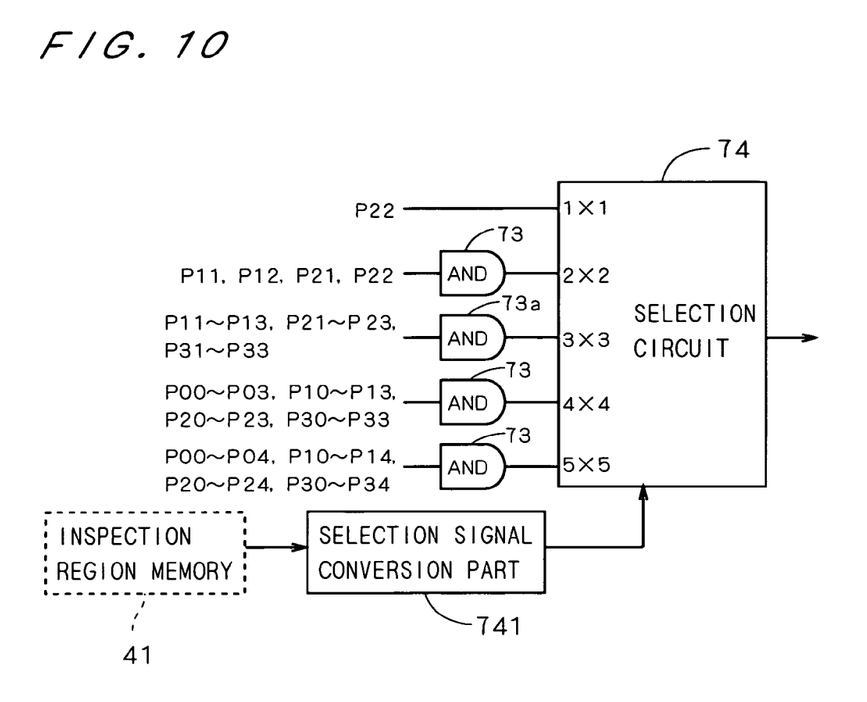
FIG. 10 is a view showing AND circuits and a selection circuit.

FIGS. 9 and 10 are views showing part of construction of the defect limiting circuit (arithmetic circuit) 71, and specifically, FIG. 9 shows an extraction circuit 72 and FIG. 10 shows a plurality of AND circuits 73 (four in the second preferred embodiment) and one selection circuit 74. In an actual case, the extraction circuit 72 of FIG. 9 is electrically connected to the AND circuits 73 and the selection circuit 74 of FIG. 10.

The extraction circuit 72 of FIG. 9 has a plurality of line buffers 721 to which the pixel values of the defect region image are inputted from the defect detector 43 and a plurality of DFF (D Flip-Flop) circuits 722 arranged in a matrix with five rows and four columns in predetermined row and column directions. To the top DFF circuit 722 on the side of the line buffer 721 in each line of the DFF circuits 722 arranged in the lateral (row) direction, a pixel value delayed in accordance with the row number is inputted from the line buffer 721. Specifically, when one specified pixel value in the defect region image is inputted to the top DFF circuit 722a in the first (uppermost) row, a pixel value in the defect region image which is inputted in advance of the specified pixel value by one line is inputted to the top DFF circuit 722 in the second (one lower) row, and a pixel value in the defect region image which is inputted in advance of the specified pixel value by four lines is inputted to the top DFF circuit 722 in the fifth (last) row. When one pixel value is inputted to each of the DFF circuits 722 arranged in the row direction from the adjacent DFF circuit 722 on the side of the line buffer 721 or the line buffer 721, the DFF circuit 722 outputs the pixel value to the downstream side opposite to the line buffer 721 (in other words, to the next DFF circuit 722 on the downstream side if exists) in response to the next clock pulse.

The extraction circuit 72 extracts five pixel values which are inputted to the top DFF circuits 722 in the respective lines (P00, P10, P20, P30 and P40 in FIGS. 9 and 10) and twenty pixel values which are simultaneously outputted from a plurality of DFF circuits 722 (P01 to P04, P11 to P14, P21 to P24, P31 to P34 and P41 to P44 in FIGS. 9 and 10). In other words, the extraction circuit 72 extracts a group of pixel values in a range of 5×5 pixels (hereinafter, referred to as "extraction range") in the defect region image and the extraction range is moved (scanned) in the defect region image in response to the clock pulse. The size of extraction range is not limited to 5×5 pixels but depends on the number of DFF circuits 722 arranged in the extraction circuit 72.

Among the group of pixel values in the extraction range, the center pixel value P22 is directly inputted to the selection circuit 74 of FIG. 10, and to the four AND circuits 73, predetermined combinations of pixel values are inputted as discussed later. The selection circuit 74 selects either of the pixel value P22 and any one of four logical products outputted from the four AND circuits 73 in response to a signal from a selection signal conversion part 741.

When the defect detection apparatus 1a of FIG. 8 detects defects of a pattern, like in the defect detection apparatus 1 of FIG. 1, the inspection regions 62 are determined and values are inputted to the cells in the inspection region memory 41 (FIG. 2: Step S11). At this time, in the defect detection apparatus 1a, different values (e.g., "1", "2" and "3") are associated with the three inspection regions 62 shown in FIG. 3, and as conceptually shown in FIG. 11, the values "1", "2" and "3" associated with the inspection regions 62 are inputted to the cells 411 in the inspection region memory 41, respectively, which correspond to the pixel values in the inspection regions 62 (indicated by broken lines in FIG. 11) and a value of "0" is inputted to the other cells 411. In the second preferred embodiment, a defect detection condition is set, which indicates a predetermined shape (square in this preferred embodiment) having a different area (i.e., the number of pixels or size) for each inspection region 62 (in other words, a detection condition on the area and the shape of defect) (Step S12).

After the inspection regions 62 and the defect detection conditions are set, like in the first preferred embodiment, a reference image is acquired from the reference substrate 9 (Step S13) and subsequently a target image is acquired by the image pickup part 3 (Step S14). Pixel values in the target image are sequentially outputted to the defect detector 43 and a differential absolute value between each pixel value in the target image and the corresponding pixel value in the reference image is obtained and binarized with a predetermined threshold value. From the inspection region memory 41, a value in the corresponding cell 411 is outputted, and a logical product of the binarized value and the value from the inspection region memory 41 (if more than "1", "1" is used) is obtained (in other words, the binarized differential absolute value image is masked). With this operation, in the defect detector 43, a binary defect region image representing a region of defects in the target image is generated to detect defects included in a plurality of inspection regions 62 (Step S15).

The pixel values in the defect region image are sequentially outputted to the defect limiting circuit 71 and further inputted to the line buffers 721 of FIG. 9, where a group of pixel values in the extraction range which is moved in the defect region image is repeatedly extracted. The group of pixel values is outputted to the AND circuit 73 or the selection circuit 74 of FIG. 10 and then the pixel value P22 and the respective logical products of the four AND circuits 73 are inputted to the selection circuit 74.

The combination of pixel values to be inputted to each AND circuit 73 is determined in accordance with the defect detection condition set for each inspection region 62. As discussed earlier, the defect detection condition indicates a predetermined shape having a specific area. For example, any one of squares having areas of 1×1 pixel, 2×2 pixels, 3×3 pixels, 4×4 pixels and 5×5 pixels is determined as the defect detection condition for each inspection region 62, and a defect having a size which includes the square with the determined area is regarded as one to be detected. In this case, to the four AND circuits 73, four values of 2×2 pixels, i.e., P11, P12, P21 and P22, nine values of 3×3 pixels, i.e., P11 to P13, P21 to P23 and P31 to P33, sixteen values of 4×4 pixels, i.e., P00 to P03, P10 to P13, P20 to P23 and P30 to P33, and twenty-five values of 5×5 pixels, i.e., P00 to P04, P10 to P14, P20 to P24, P30 to P34 and P40 to P44 are inputted respectively. In other words, to each of the four AND circuits 73, the values of pixels out of the groups of pixel values in the extraction range, which are included in the pixel array satisfying the defect detection condition, are inputted. In each of the AND circuits 73, when all the inputted pixel values indicate "defect" (in other words, the corresponding pixel array is included in the region of defect), a logical product of "1" is outputted to the selection circuit 74 and otherwise a logical product of "0" is outputted thereto. The one pixel value P22 of 1×1 pixel is directly inputted to the selection circuit 74 as discussed above.

Figure 11:
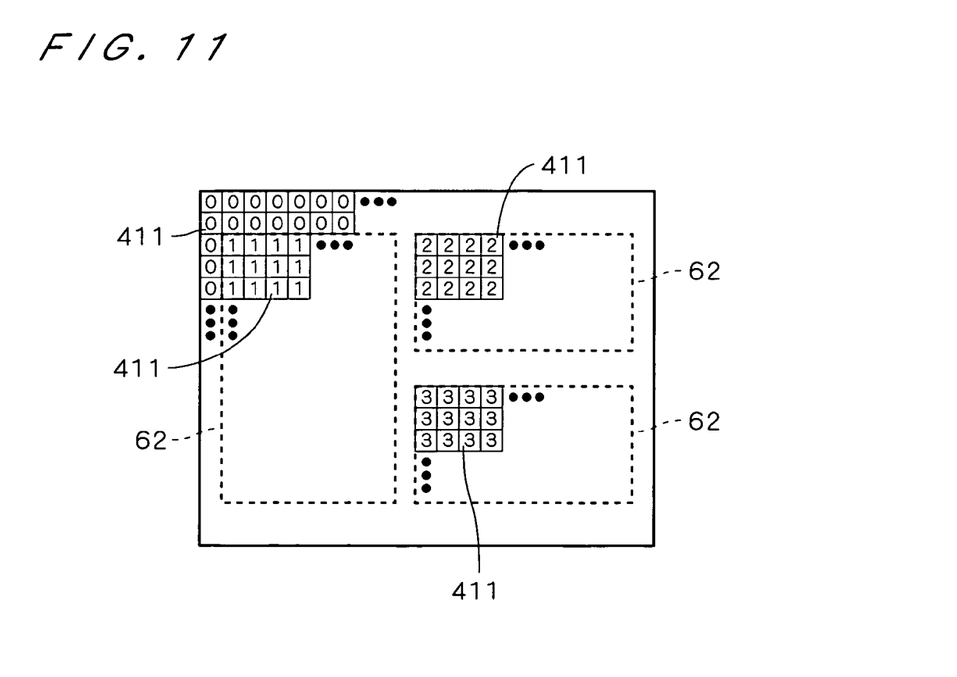
FIG. 11 is a conceptual diagram showing an inspection region memory.

As for the selection circuit 74, a value of the cell 411 corresponding to the pixel having the pixel value P22 is read out from the inspection region memory 41 of FIG. 11 and converted by the selection signal conversion part 741, and then inputted to the selection circuit 74. When the defect detection condition for the inspection region 62 including the pixel having the pixel value P22 indicates a square of 3×3 pixels, for example, the selection circuit 74 selects an output from the AND circuit 73a to which the nine pixel values, P11 to P13, P21 to P23 and P31 to P33, are inputted, on the basis of a signal from the selection signal conversion part 741. In other words, in accordance with the defect detection condition for the inspection region 62 including the pixel having the pixel value P22 which is positioned at the center in the extraction range, the selection circuit 74 selects the pixel value P22 which is directly inputted thereto from the extraction circuit 72 or one of the respective four logical products outputted from the four AND circuits 73. Through this operation, the defect region image representing the region of defect determined in accordance with the defect detection condition is generated and the pixel values in the image (in other words, the selected values) are outputted to the inspection region memory 41 and stored therein (Step S16). The selection by the selection circuit 74 may be performed in accordance with the defect detection condition for the inspection region 62 including the pixel having a pixel value other than the pixel value P22 positioned at the center of the extraction range.

The computer 5 reads out pixel values for each predetermined region in the defect region image memory 44 and performs a labeling operation on the pixel values, and after that, the barycentric coordinates and the area of the defect are calculated. Then, the defect map is displayed on the display part of the computer 5 as necessary. In the defect region image after the limitation which is acquired by the defect detection apparatus 1a, the area of the defect becomes smaller as the area of the square indicated by the defect detection condition becomes larger, but in the computer 5, the area of the defect represented in the defect region image after the limitation (i.e., selection of defects) may be obtained or the area may be acquired after the defect is dilated in accordance with the defect detection condition for the inspection region 62.

Thus, in the defect limiting circuit 71 of the defect detection apparatus 1a of FIG. 8, a group of pixel values in the extraction range which is moved in the defect region image are extracted and it is checked by calculation if the pixel array satisfying the defect detection condition for the inspection region 62 including a predetermined pixel in the extraction range is included in the region of defect in the defect region image. In the defect detection apparatus 1a, by using the defect detection condition on a predetermined shape having a different area for each inspection region 62, it is possible to detect defects in accordance with the inspection region with high efficiency at high speed.

The defect detection condition for each inspection region 62 may be set on shapes other than a square having a specific area (the same applies to the following). Though specific discussion will be made after descriptions on all the preferred embodiments, the pixel arrays having the pixel values inputted to the AND circuits 73 may be ones representing various shapes which are different from one another, other than ones representing predetermined shapes having changed areas, and are variously changeable in accordance with the defect detection conditions. Therefore, scanning the extraction range in the defect region image can be thought to be equivalent to scanning the pixel array changeable in accordance with the defect detection condition. Naturally, depending on a design of the defect limiting circuit, limitation of the defects in the defect region image may be performed by actually scanning the pixel array in the defect region image, which is changeable in accordance with the defect detection condition.

When the value outputted from the inspection region memory 41 is "0", by designing the selection circuit 74 to always output "0", an operation of masking the differential absolute value image after being binarized in the defect detector 43 may be omitted.

Figure 12:
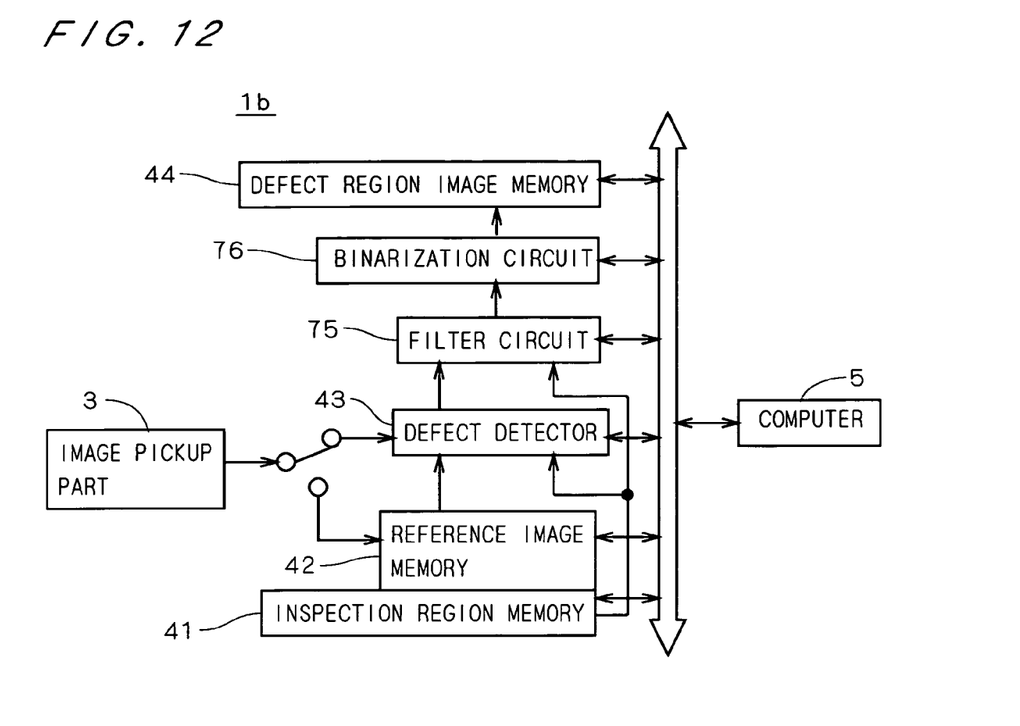
FIG. 12 is a view showing a construction of a defect detection apparatus in accordance with a third preferred embodiment.

FIG. 12 is a view showing a construction of a defect detection apparatus 1b in accordance with the third preferred embodiment of the present invention. The defect detection apparatus 1b of FIG. 12 is different from the defect detection apparatus 1 of FIG. 1 in that a filter circuit 75 and a binarization circuit 76 are provided between the defect detector 43 and the defect region image memory 44 and the inspection region memory 41 stores data of multivalued bitmap like in the defect detection apparatus 1a of FIG. 8. The constituent elements other than the above are identical to those in the defect detection apparatus 1 of FIG. 1 and represented by the same reference signs.

In detection of defects of a pattern by the defect detection apparatus 1b of FIG. 12, like in the second preferred embodiment, an operator determines inspection regions 62 (FIG. 2: Step S11), a value associated with each of the inspection regions 62 is inputted to the cells 411 in the inspection region memory 41 which correspond to the pixels included in the inspection region 62 and "0" is inputted to the other cells 411 (see FIG. 11). Further, a defect detection condition for each inspection region 62 on a predetermined shape having a specific area is determined (Step S12).

Subsequently, a reference image is acquired and stored in the reference image memory 42 (Step S13), and after that, a target image is acquired and pixel values in the target image are sequentially outputted to the defect detector 43 (Step S14). The defect detector 43 calculates a differential absolute value between each pixel value in the target image and a corresponding pixel value in the reference image and the inspection region memory 41 outputs a value in a corresponding cell 411. Then, when the value outputted from the inspection region memory 41 is "0", the differential absolute value is changed into "0" and when the value is one of other values, the differential absolute value is not changed (in other words, the differential absolute value image is masked), and a grayscale defect image representing defects included in a plurality of inspection regions 62 is generated (Step S15). The pixel values in the defect image are sequentially inputted to the filter circuit 75, where a spatial filtering operation is performed on the defect image.

Figure 13:
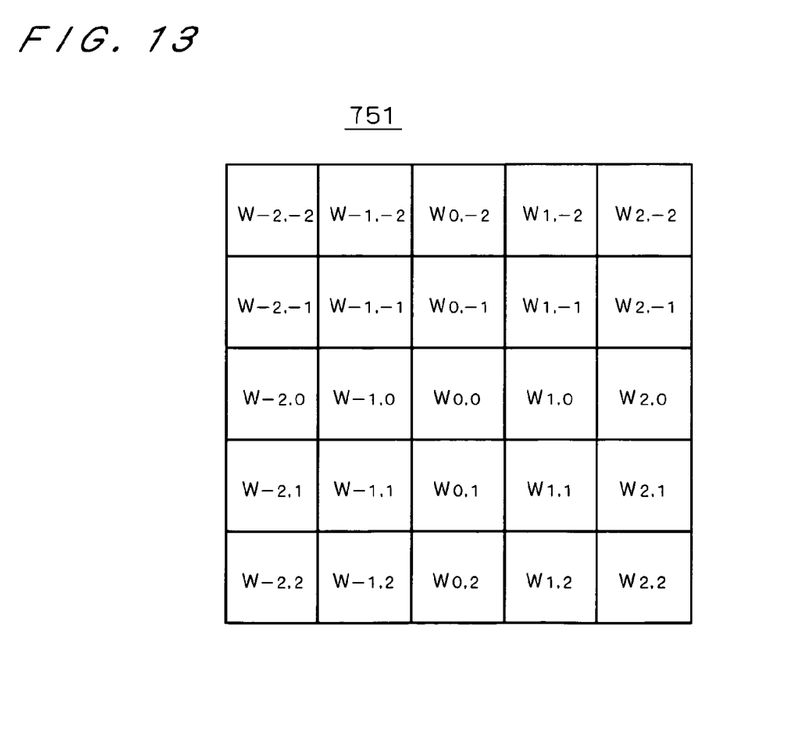
FIG. 13 is a view showing a filter used in a filter circuit.

Herein, discussion will be made on the filter circuit 75. FIG. 13 is a view showing a filter 751 used in the filter circuit 75. Element values (weighting factors) W of elements in the filter 751 are changeable in accordance with an input from the computer 5. In processing one specified pixel in an object image by the filter circuit 75, the filter 751 is superimposed on the object image so that the center element of the filter 751 should be positionally adjusted onto the specified pixel and a value of the specified pixel, $I_{0,0}$, is converted into a new pixel value "Out" by calculating Eq. 1. In an element value $W_{ij}$ and a pixel value $I_{ij}$ of Eq. 1, i represents a relative position with respect to the specified pixel which is the center element in a column direction and j represents a relative position thereof in a row direction, and i and j are each an integer ranging from −2 to 2.

$$\text{Out} = \frac{\sum_{ij} I_{ij} \cdot W_{ij}}{\sum_{ij} W_{ij}}$$

$$= \frac{I_{-2,-2} \cdot W_{-2,-2} + I_{-1,-2} \cdot W_{-1,-2} + \ldots + I_{2,2} \cdot W_{2,2}}{W_{-2,-2} + W_{-1,-2} + \ldots + W_{2,2}}$$

Eq. 1

As can be seen from Eq. 1, the filter circuit 75 is a multiply-add filter. If a value of the center element $W_{0,0}$ is "1" and values of the other elements are "0" in the filter 751, the filter circuit 75 outputs the object image, being not changed. If values of the center 3×3 elements are "1" and values of the other elements are "0", the filter serves as a moving-average filter having kernel size of 3×3 pixels, and if values of all the 5×5 elements are "1", the filter serves as a moving-average filter having kernel size of 5×5 pixels. Such a moving-average filter is generally used as a smoothing filter and can reduce noise not larger than the kernel size and the characteristics of pixel value of a defect.

The filter circuit 75 receives the value of the cell 411 in the inspection region memory 41 which corresponds to each pixel in the defect image, and in accordance with the defect detection condition set for the inspection region 62 which is specified by this value, the element values in the filter 751 are changed by the computer 5 (though the arrangement of the element values in the filter 751 in accordance with the defect detection condition is determined in advance) and a new pixel value for this pixel is thereby acquired.

In a case where the defect detection condition indicates a square of 3×3 pixels, for example, "1 " is set to the values of the center 3×3 elements in the filter 751 and "0" is set to the values of the other elements, a new pixel value is acquired by calculating Eq. 1, and in a case where the defect detection condition indicates a square of 4×4 pixels, "1" is set to the values of the 4×4 elements almost around the center element in the filter 751 (specifically, the inner arrangement of 2×2 elements among the arrangement of 4×4 elements includes the center element) and "0" is set to the values of the other elements, and after the above setting, a new pixel value is acquired. Through the operation by the filter circuit 75, the filter is applied to the defect image with positioning the center of the filter almost at each pixel in the defect image, and the filter is set in accordance with the defect detection condition for the inspection region including the pixel at the center of the filter. If the defect in the defect image is smaller than the square having the area indicated by the defect detection condition (exactly, the defect has a size which can not include the square), the values of the pixels included in the region of this defect decrease on the whole.

If the distribution of element values in the filter 751 is a two-dimensional Gaussian distribution, the filter circuit 75 can be used as a Gaussian filter. The filter circuit 75 is not limited to the multiply-add filter but may be other types of filters only if, with positioning the center of a filter almost at each pixel in the defect image, the filter in accordance with the defect detection condition for the inspection region 62 including the pixel (at the center) can be applied to the defect image.

The pixel values in the defect image to which the filter is applied are sequentially outputted to the binarization circuit 76 and compared with a predetermined threshold value (which may be changed for each inspection region 62), and a value of "1" is outputted when the pixel value is larger than the threshold value and a value of "0" is outputted when the pixel value is smaller than the threshold value. In other words, the defect image to which the filter is applied is binarized by the binarization circuit 76. At this time, if the defect is smaller than the square having the area indicated by the corresponding defect detection condition, as the pixel values become smaller on the whole as discussed above, the possibility that a value of "1" is outputted (in other words, the defect is selected as a defect to be detected) decreases. With this operation, a defect region image representing a region of defects selected (i.e., limited) in accordance with the defect detection condition for the inspection region 62 is generated and stored in the defect region image memory 44 (Step S16). The computer 5 calculates the barycentric coordinates and the area of the defect selected are calculated by reading out the pixel values from the defect region image memory 44 and the defect map is displayed on the display part of the computer 5 as necessary.

Thus, in the defect detection apparatus 1b of FIG. 12, with respect to each pixel in the grayscale defect image representing defects, the filter circuit 75 applies a filter in accordance with a defect detection condition for the inspection region 62 including the (each) pixel to obtain new pixel values and the binarization circuit 76 binarizes the new pixel values with a predetermined threshold value, to perform substantial limitation of the defects in the defect image on the basis of the defect detection condition set for each inspection region 62. In the defect detection apparatus 1b, it is thereby possible to detect defects in accordance with the inspection region with high efficiency by using a simple construction.

If the value outputted from the inspection region memory 41 is "0", the operation of masking the differential absolute value image by the defect detector 43 may be omitted by designing the filter circuit 75 to always output "0".

Figure 14:
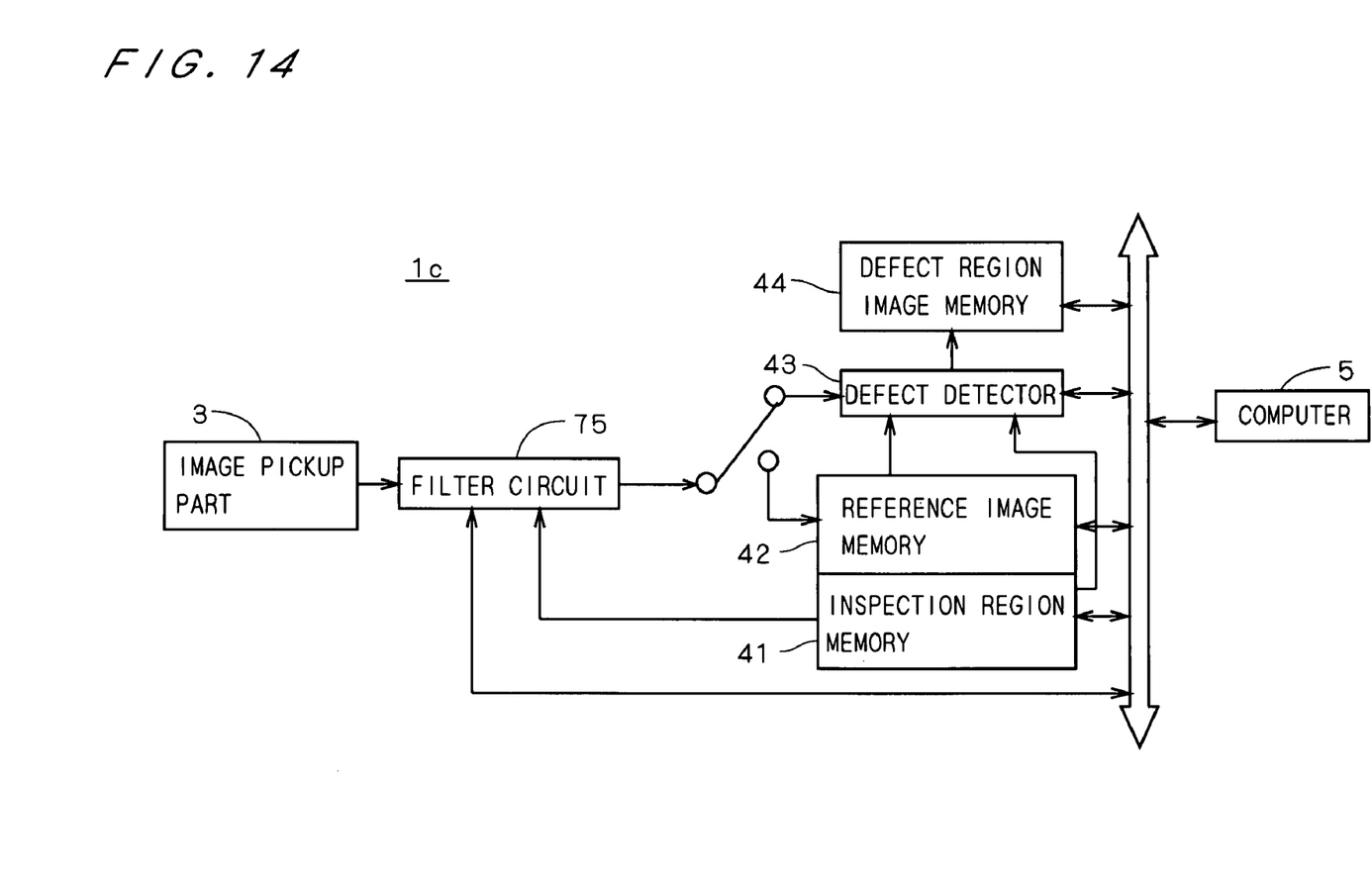
FIG. 14 is a view showing a construction of a defect detection apparatus in accordance with a fourth preferred embodiment.

FIG. 14 is a view showing a construction of a defect detection apparatus 1c in accordance with the fourth preferred embodiment of the present invention. The defect detection apparatus 1c of FIG. 14 is different form the defect detection apparatus 1 of FIG. 1 in that an image from the image pickup part 3 is outputted to the defect detector 43 or the reference image memory 42 through the filter circuit 75 and the inspection region memory 41 stores data of multivalued bitmap like in the defect detection apparatuses 1a and 1b of FIGS. 8 and 12.

In detection of defects of a pattern by the defect detection apparatus 1c of FIG. 14, like in the second and third preferred embodiments, inspection regions 62 are determined, a defect detection condition for each inspection region 62 on the area of a predetermined shape (e.g., a square) of defect is determined (FIG. 2: Steps S11 and S12), and the image pickup part 3 acquires a reference image (Step S13). At this time, in the defect detection apparatus 1c, the filter circuit 75 applies such a filter as used in the third preferred embodiment to the reference image. In other words, a filtering operation is performed on the reference image with positioning the center of a filter almost at each the pixel in the reference image, and element values of the filter are changed in accordance with the defect detection condition for the inspection region 62 including the pixel at the center of the filter. The pixels in the reference image after the filtering operation are outputted to the reference image memory 42 and stored therein. The filter circuit 75 may not perform the filtering operation on the pixels not included in the inspection region 62.

As for the target image acquired subsequently, the filter circuit 75 applies a filter to the target image with positioning the center of the filter almost at each pixel in the target image, and the filter is set in accordance with the defect detection condition for the inspection region 62 including the pixel at the center of the filter. The pixels in the target image after the filtering operation are sequentially outputted to the defect detector 43 (Step S14). At this time, in the operation by the filter circuit 75, if the defect in the target image is smaller than the square having the area indicated by the defect detection condition for the inspection region 62 including this defect (in other words, the defect has a size not including the square), the value of the pixel in the region of defect is made approximate to the corresponding pixel value in the reference image.

The defect detector 43 calculates a differential absolute value between the pixel value in the target image after the filtering operation and the corresponding pixel value in the reference image after the same filtering operation and the differential absolute value is compared with a predetermined threshold value, to be binarized. A value of the corresponding cell 411 in the inspection region memory 41 is outputted (see FIG. 11) and a logical product of this value (if not smaller than "1", "1" is used for this value) and the binarized value is calculated. With this operation, a binary defect region image representing the region of defects included in a plurality of inspection regions 62 is generated, and the defect detector 43 thereby detects (regions of) defects (Step S15).

At this time, since a filter in accordance with the defect detection condition for the inspection region 62 including each pixel to the target image and the reference image, as discussed earlier, if the defect is smaller than the square having the area indicated by the defect detection condition, the difference in pixel value between the target image and the reference image in the region of defect becomes smaller and the defect becomes harder to detect. Therefore, the defects detected by the defect detector 43 are ones which are substantially selected by limitation through the operation of the filter circuit 75 on the basis of the defect detection condition for the inspection region 62 including the defect, and this means that detection and limitation of the defects are performed at the same time (Step S16). The pixel values in the defect region image representing the region of the selected defects (i.e., defects selected after limitation) are outputted to the defect region image memory 44 and stored therein, and the computer 5 acquires predetermined information of the defects.

Thus, the defect detection apparatus 1c of FIG. 14 is provided with the filter circuit 75 which applies a filter to the target image and the reference image outputted from the image pickup part 3 with positioning the center of the filter almost at each pixel in these images, and the filter is set in accordance with the defect detection condition for the inspection region 62 including the pixel at the center of the filter, and from the target image and the reference image to which the filters are applied, the defect detector 43 detects the defects which are included in a plurality of inspection regions 62 and selected in accordance with the corresponding defect detection condition. It is thereby possible, in the defect detection apparatus 1c, to efficiently detect defects in accordance with the inspection regions 62 with simple construction.

In the above discussion on the second to fourth preferred embodiments, a predetermined shape having a specific area is set as the defect detection condition for each inspection region, but in the defect detection apparatus, a variety of shapes may be set as the defect detection condition for each inspection region.

For detecting, for example, defects including a longitudinally long shape and a laterally long shape in one inspection region and another inspection region, respectively, in the defect detection apparatus 1a of FIG. 8, pixel values P02, P12, P22, P32 and P42 are inputted to one AND circuit and pixel values P20, P21, P22, P23 and P24 are inputted to another AND circuit (see FIG. 9) and then the selection circuit selects the output from either one of these AND circuits for each inspection region. With this operation, it is possible to detect the defects including the longitudinally long shape and the laterally long shape, respectively. In the defect detection apparatus 1b or 1c of FIG. 12 or 14, "1" is set to the element values of the filter 751, $W_{0,-2}$, $W_{0,-1}$, $W_{0,0}$, $W_{0,1}$ and $W_{0,2}$ and "0" is set to the other element values for one inspection region and "1" is set to the element values of the filter 751, $W_{-2,0}$, $W_{-1,0}$, $W_{0,0}$, $W_{1,0}$ and $W_{2,0}$ and "0" is set to the other element values for another inspection region, to detect the defects including the longitudinally long shape and the laterally long shape, respectively. Naturally, the defect detection conditions on the shapes of defect may be a variety of shapes, such as L-shape or the like, as well as the longitudinally long shape and the laterally long shape.

Within the range of tolerance of hardware resources, by increasing the number of DFF circuits 722 of the extraction circuit 72 in the defect detection apparatus 1a or changing the size of the filter 751 of the filter circuit 75 in the defect detection apparatus 1b or 1c, it is possible to variously change the defect detection condition on the area or the shape of defect.

On the other hand, in the defect detection apparatus 1 of FIG. 1, a defect detection condition (area threshold value) on an area, not limited to a predetermined shape, may be set for each inspection region, but also in the defect detection apparatus 1, a variety of shapes may be set for each inspection region as the defect detection condition. For example, the computer 5 obtains a circumscribed rectangle of the defect after labeling, and with the ratio of the circumscribed rectangle between the longitudinal direction and the lateral direction, a defect of longitudinally long shape or laterally long shape can be detected for each inspection region. In other words, in the defect detection apparatus 1 of FIG. 1, it is possible to highly detect defects on the condition in accordance with the inspection region on the basis of the area or (and) the shape of defect.

Thus, in the defect detection apparatus 1 of FIG. 1 and the defect detection apparatuses 1a to 1c of FIGS. 8, 12 and 14, it is possible to detect defects with high efficiency by using a defect detection condition on a different area or shape of defect for each inspection region.

In the defect detection apparatus, a defect detection condition setting part for automatically setting inspection regions and defect detection conditions may be provided. In the defect detection condition setting part, by performing edge extraction for each arbitrary region to obtain the density of edges in the target image and the reference image (or obtain the spatial frequency), a defect detection condition indicating a small area is set for a region having edges of high density (or high frequency) and a defect detection condition indicating a large area is set for a region having edges of low density (or low frequency).

Though the preferred embodiments of the present invention have been discussed above, the present invention is not limited to the above-discussed preferred embodiments, but allows various variations.

In the above-discussed preferred embodiments, defects can be easily detected in the defect detector 43 by comparing the pixel values in the target image with the corresponding pixel values in the reference image, but depending on a pattern formed on the substrate 9, there may be a case, for example, where the target image is binarized and the pattern of the binary target image is dilated and then eroded, and after that, an exclusive OR (logical sum) of an image after erosion and an image after dilation is obtained, to detect a region of defects in the target image without using the reference image.

If it is not necessary to detect defects selected (or limited) at high speed, the same function as the filter circuit 75 (and the binarization circuit 76) in the third and fourth preferred embodiments may be implemented by the computer 5, and considering the operation of the defect limiting circuit 71 in the second preferred embodiment as the filtering operation for the binary image, the operation may be performed by the computer 5. Naturally, detection of defects included in a plurality of inspection regions 62 may be performed through the operation of the computer 5.

Though the defect detection is performed on a patter formed on a semiconductor substrate in the above-discussed preferred embodiments, the defect detection apparatus can be used for detection of defects in a pattern formed on, e.g., a printed circuit board or a glass substrate for manufacturing a flat panel display, or the like.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2004-283122 filed in the Japan Patent Office on Sep. 29, 2004, the entire disclosure of which is incorporated herein by reference.

What is claimed is:

1. A defect detection apparatus for detecting defects of a pattern formed on a substrate, comprising:

an image pickup part for picking up an image of a substrate to acquire a grayscale target image;

a defect detector for detecting defects included in a plurality of predetermined inspection regions in said target image; and a defect limiting part for performing limitation of defects to be detected by said defect detector, on the basis of a defect detection condition which is determined for each inspection region on an area or a shape of defect, wherein said defect detector generates a grayscale defect image representing a defect, from said target image, and said defect limiting part comprises a filter circuit for applying a filter to said defect image with positioning the center of said filter at each pixel in said defect image, element values of elements in said filter being changed in accordance with a defect detection condition for an inspection region including said each pixel; and a binarization circuit for binarizing said defect image to which said filter is applied, to generate a defect region image representing regions of defects after limitation.

2. The defect detection apparatus according to claim 1, wherein said defect detector compares said target image with a reference image to detect defects.

3. A defect detection apparatus for detecting defects of a pattern formed on a substrate, comprising:

an image pickup part for picking up an image of a substrate to acquire a grayscale target image;

a filter circuit for applying a filter to said target image;

a defect detector for detecting defects on the basis of said target image to which said filter is applied, wherein a plurality of inspection regions in which defects are detected by said defect detector and a defect detection condition on an area or a shape of defect in each of said plurality of inspection regions are determined with respect to said target image in advance, and said filter circuit applies a filter to said target image with positioning the center of said filter at each pixel in said target image, and element values of elements in said filter are changed in accordance with a defect detection condition for an inspection region including said each pixel.

4. The defect detection apparatus according to claim 3, wherein said filter circuit applies a filter to a reference image with positioning the center of said filter at each pixel in said reference image, and said filter is set in accordance with a defect detection condition for an inspection region including said each pixel, and said defect detector compares said target image to which said filter is applied with said reference image to which said filter is applied, to detect defects.

5. A defect detection apparatus for detecting defects of a pattern formed on a substrate, comprising:

an image pickup part for picking up an image of a substrate to acquire a grayscale target image;

a defect detector for detecting defects included in a plurality of predetermined inspection regions in a target image; and a defect limiting part for performing limitation of defects to be detected by said defect detector, on the basis of a defect detection condition which is determined for each inspection region on an area or a shape of defect, wherein said defect detector generates a binary defect region image representing regions of defects in said target image, said defect limiting part is an arithmetic circuit for scanning a pixel array in said defect region image to check if said pixel array is included in said regions of defects and said pixel array is changeable in accordance with a defect detection condition, and said arithmetic circuit comprises an extraction circuit for extracting a group of pixel values in a predetermined extraction range which is moved in said defect region image;

a plurality of AND circuits each for outputting a logical product of values of pixels out of said group of pixel values, which are included in a pixel array satisfying a defect detection condition, a plurality of pixel arrays which respectively correspond to said plurality of AND circuits, being different from one another; and a selection circuit for selecting any of a plurality of logical products outputted from said plurality of AND circuits in accordance with a defect detection condition for an inspection region including a predetermined pixel in said extraction range.

6. The defect detection apparatus according to claim 5, wherein said defect detector compares said target image with a reference image to detect defects.

7. A defect detection method for detecting defects of a pattern formed on a substrate, comprising the steps of:

a) picking up an image of a substrate to acquire a grayscale target image;

b) detecting defects included in a plurality of predetermined inspection regions in said target image; and c) performing limitation of defects to be detected in said step of detecting defects, on the basis of a defect detection condition which is determined for each inspection region on an area or a shape of defect, wherein a grayscale defect image representing defects is generated from said target image in said step b), and a filter is applied to said defect image with positioning the center of said filter at each pixel in said defect image, and element values of elements in said filter are changed in accordance with a defect detection condition for an inspection region including said each pixel, and said defect image to which said filter is applied is binarized to generate a defect region image representing regions of defects after limitation in said step c).

8. The defect detection method according to claim 7, wherein said target image is compared with a reference image to detect defects in said step b).

9. A defect detection method for detecting defects of a pattern formed on a substrate, comprising the steps of:

a) picking up an image of a substrate to acquire a grayscale target image and applying a filter to said target image; and b) detecting defects on the basis of said target image to which said filter is applied, wherein a plurality of inspection regions in which defects are detected and a defect detection condition on an area or a shape of defect in each of said plurality of inspection regions are determined with respect to said target image in advance, and a filter is applied to said target image with positioning the center of said filter at each pixel in said target image, and element values of elements in said filter are changed in accordance with a defect detection condition for an inspection region including said each pixel in said step a).

10. The defect detection method according to claim 9, further comprising the step of c) applying a filter to a reference image with positioning the center of said filter at each pixel in a reference image, and said filter is set in accordance with a defect detection condition for an inspection region including said each pixel, wherein said target image to which said filter is applied is compared with said reference image to which said filter is applied, to detect defects in said step b).

11. A defect detection method for detecting defects of a pattern formed on a substrate, comprising the steps of:

a) picking up an image of a substrate to acquire a grayscale target image;

b) detecting defects included in a plurality of predetermined inspection regions in said target image; and c) performing limitation of defects to be detected in said step of b), on the basis of a defect detection condition which is determined for each inspection region on an area or a shape of defect, wherein a binary defect region image representing regions of defects in said target image is generated in said step b), a pixel array is scanned in said defect region image to check if said pixel array is included in said regions of defects and said pixel array is changeable in accordance with a defect detection condition, and at this time, a group of pixel values in a predetermined extraction range which is moved in said defect region image is repeatedly extracted, a logical product of values of pixels out of said group of pixel values, which are included in each of a plurality of pixel arrays respectively satisfying a plurality of defect detection conditions and being different from one another, is obtained and any one of a plurality of logical products corresponding to said plurality of defect detection conditions is selected in accordance with a defect detection condition for an inspection region including predetermined a pixel in said extraction range in said step c).

12. The defect detection method according to claim 11, wherein
said target image is compared with a reference image to detect defects in said step b).

* * * * *